(12) United States Patent
Rudolph

(10) Patent No.: US 6,422,175 B1
(45) Date of Patent: Jul. 23, 2002

(54) DECORATIVE ATTACHMENT FOR AN AQUARIUM

(76) Inventor: Alan Rudolph, 346 Florence St., Mamaroneck, NY (US) 10543

( * ) Notice: Subject to any disclaimer, the term of this patent is extended or adjusted under 35 U.S.C. 154(b) by 0 days.

(21) Appl. No.: 09/751,741

(22) Filed: Dec. 29, 2000

(51) Int. Cl.$^7$ .............................................. A01K 63/00
(52) U.S. Cl. ...................................................... 119/256
(58) Field of Search ................................ 119/256, 254, 119/248, 257, 246, 253, 258; 428/15

(56) References Cited

U.S. PATENT DOCUMENTS

| | | | |
|---|---|---|---|
| 460,810 A | * 10/1891 | Gunther | 119/256 |
| 3,059,091 A | * 10/1962 | Wenzel | 119/256 |
| 3,121,417 A | * 2/1964 | Goldman et al. | 119/253 |
| 3,149,608 A | * 9/1964 | Murphy | 119/253 |
| 3,390,665 A | 7/1968 | Wininger | |
| 3,730,138 A | * 5/1973 | Suchowski | 119/253 |
| 3,763,997 A | * 10/1973 | Willinger et al. | 206/45.34 |
| 4,006,711 A | * 2/1977 | Frank | 119/253 |
| 4,160,427 A | 7/1979 | Holbrook | |
| 4,185,743 A | * 1/1980 | Willnger | 206/423 |
| 4,318,945 A | 3/1982 | Goldman et al. | |
| D290,768 S | 7/1987 | Goldman et al. | |
| 4,708,089 A | * 11/1987 | Goldman et al. | 119/253 |
| 5,690,053 A | 11/1997 | Strange, Jr. | |
| 5,732,656 A | 3/1998 | Tran | |
| 5,857,430 A | * 1/1999 | Griffiths | 119/256 |

\* cited by examiner

Primary Examiner—Charles T. Jordan
Assistant Examiner—Danielle Rosenthal

(57) ABSTRACT

A decorative attachment for an aquarium for creating natural looking scenic features for an aquarium. The decorative attachment for an aquarium includes a wall assembly including a wall structure having a front wall and a back wall being spaced from the front wall, and also having an overhang portion being securely disposed at a top of the front and back walls and extending rearwardly thereof and being adapted to mount upon a back wall of an aquarium; and also includes a plurality of scenery attachment support members being securely attached to the wall structure; and further includes a plurality of scenery attachments being removably mounted to the wall structure.

20 Claims, 5 Drawing Sheets

DECORATIVE ATTACHMENT FOR AN AQUARIUM

BACKGROUND OF THE INVENTION

1. Field of the Invention

The present invention relates to an aquarium decorative assembly and more particularly pertains to a new decorative attachment for an aquarium for creating natural looking scenic features for an aquarium.

2. Description of the Prior Art

The use of an aquarium decorative assembly is known in the prior art. More specifically, an aquarium decorative assembly heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,160,427; 3,390,665; 5,690,053; 4,318,945; 5,732,656; and U.S. Pat. No. Des. 290,768.

While these devices fulfill their respective, particular objectives and requirements, the aforementioned patents do not disclose a new decorative attachment for an aquarium. The inventive device includes a wall assembly including a wall structure having a front wall and a back wall being spaced from the front wall, and also having an overhang portion being securely disposed at a top of the front and back walls and extending rearwardly thereof and being adapted to mount upon a back wall of an aquarium; and also includes a plurality of scenery attachment support members being securely attached to the wall structure; and further includes a plurality of scenery attachments being removably mounted to the wall structure.

In these respects, the decorative attachment for an aquarium according to the present invention substantially departs from the conventional concepts and designs of the prior art, and in so doing provides an apparatus primarily developed for the purpose of creating natural looking scenic features for an aquarium.

SUMMARY OF THE INVENTION

In view of the foregoing disadvantages inherent in the known types of aquarium decorative assembly now present in the prior art, the present invention provides a new decorative attachment for an aquarium construction wherein the same can be utilized for creating natural looking scenic features for an aquarium.

The general purpose of the present invention, which will be described subsequently in greater detail, is to provide a new decorative attachment for an aquarium which has many of the advantages of the aquarium decorative assembly mentioned heretofore and many novel features that result in a new decorative attachment for an aquarium which is not anticipated, rendered obvious, suggested, or even implied by any of the prior art aquarium decorative assembly, either alone or in any combination thereof.

To attain this, the present invention generally comprises a wall assembly including a wall structure having a front wall and a back wall being spaced from the front wall, and also having an overhang portion being securely disposed at a top of the front and back walls and extending rearwardly thereof and being adapted to mount upon a back wall of an aquarium; and also includes a plurality of scenery attachment support members being securely attached to the wall structure; and further includes a plurality of scenery attachments being removably mounted to the wall structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new decorative attachment for an aquarium which has many of the advantages of the aquarium decorative assembly mentioned heretofore and many novel features that result in a new decorative attachment for an aquarium which is not anticipated, rendered obvious, suggested, or even implied by any of the prior art aquarium decorative assembly, either alone or in any combination thereof.

It is another object of the present invention to provide a new decorative attachment for an aquarium which may be easily and efficiently manufactured and marketed.

It is a further object of the present invention to provide a new decorative attachment for an aquarium which is of a durable and reliable construction.

An even further object of the present invention is to provide a new decorative attachment for an aquarium which is susceptible of a low cost of manufacture with regard to both materials and labor, and which accordingly is then susceptible of low prices of sale to the consuming public, thereby making such decorative attachment for an aquarium economically available to the buying public.

Still yet another object of the present invention is to provide a new decorative attachment for an aquarium which provides in the apparatuses and methods of the prior art some of the advantages thereof, while simultaneously overcoming some of the disadvantages normally associated therewith.

Still another object of the present invention is to provide a new decorative attachment for an aquarium for creating natural looking scenic features for an aquarium.

Yet another object of the present invention is to provide a new decorative attachment for an aquarium which includes a wall assembly including a wall structure having a front wall and a back wall being spaced from the front wall, and also having an overhang portion being securely disposed at a top of the front and back walls and extending rearwardly thereof and being adapted to mount upon a back wall of an aquarium; and also includes a plurality of scenery attachment support members being securely attached to the wall structure; and further includes a plurality of scenery attachments being removably mounted to the wall structure.

Still yet another object of the present invention is to provide a new decorative attachment for an aquarium that is easy and convenient to install inside an aquarium.

Even still another object of the present invention is to provide a new decorative attachment for an aquarium that provides a natural-looking habitat for the fish in the aquarium.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
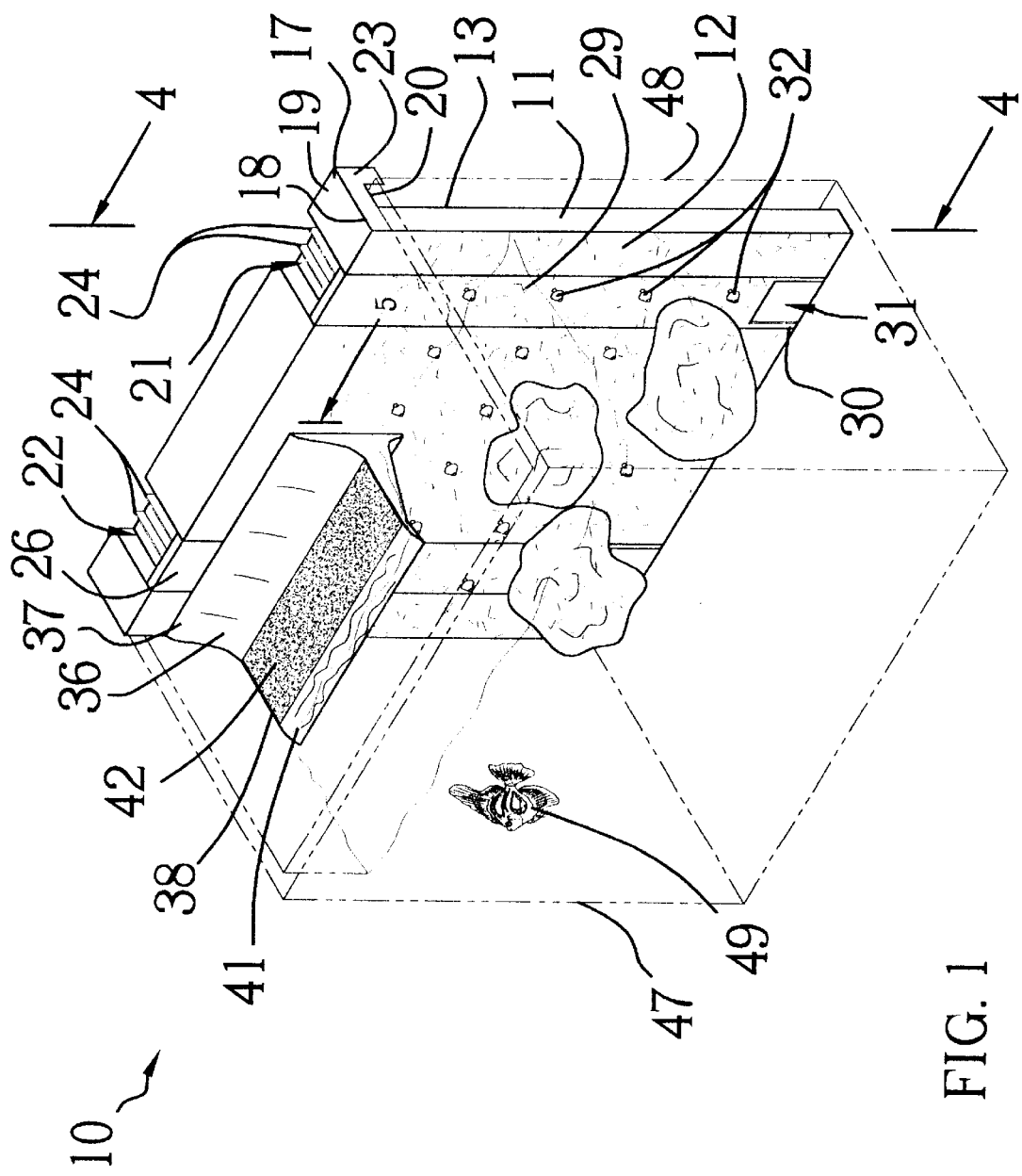
FIG. 1 is a perspective view of a new decorative attachment for an aquarium according to the present invention and shown in use.
Figure 2:
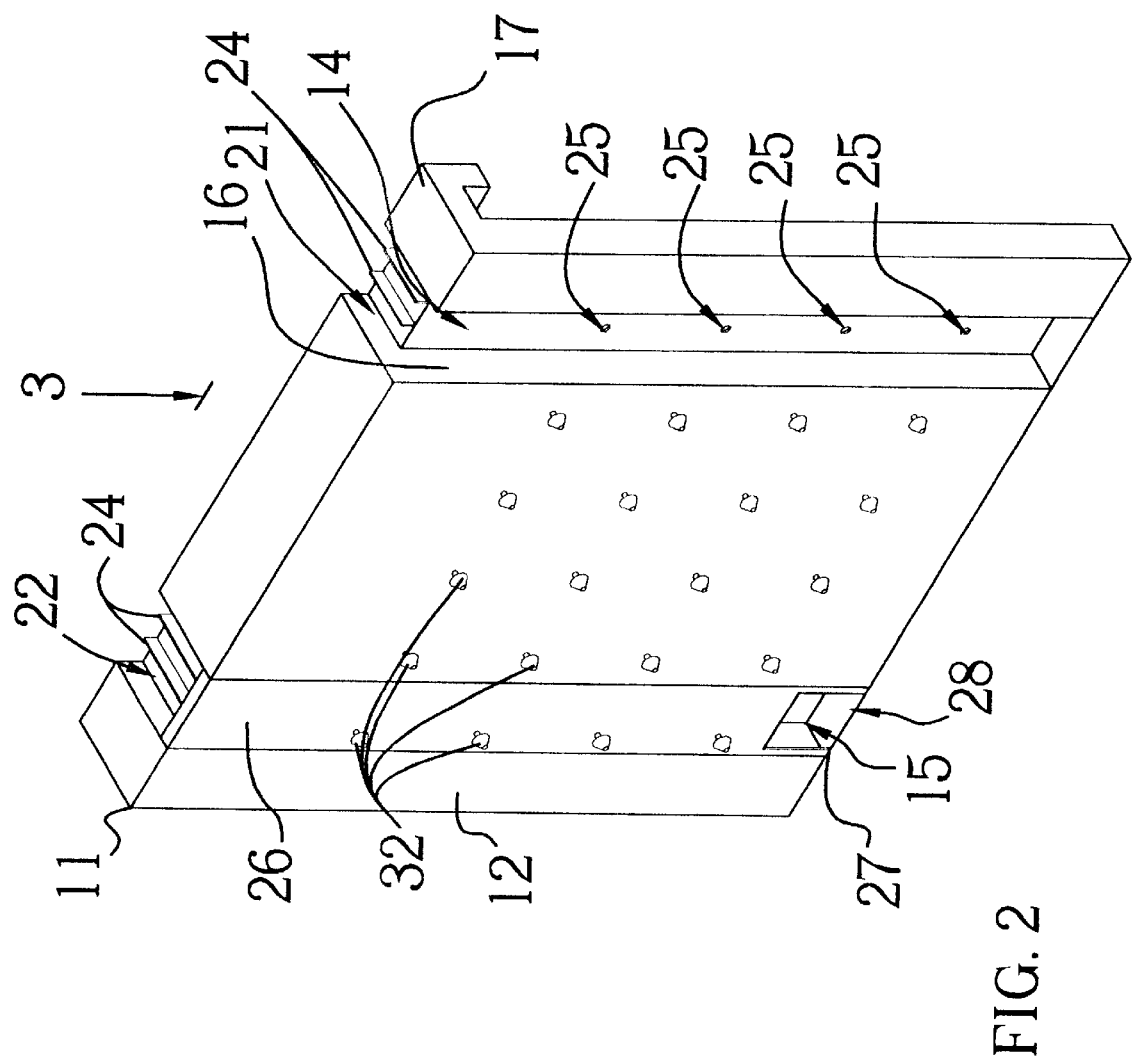
FIG. 2 is a perspective view of the wall member of the present invention.
Figure 3:
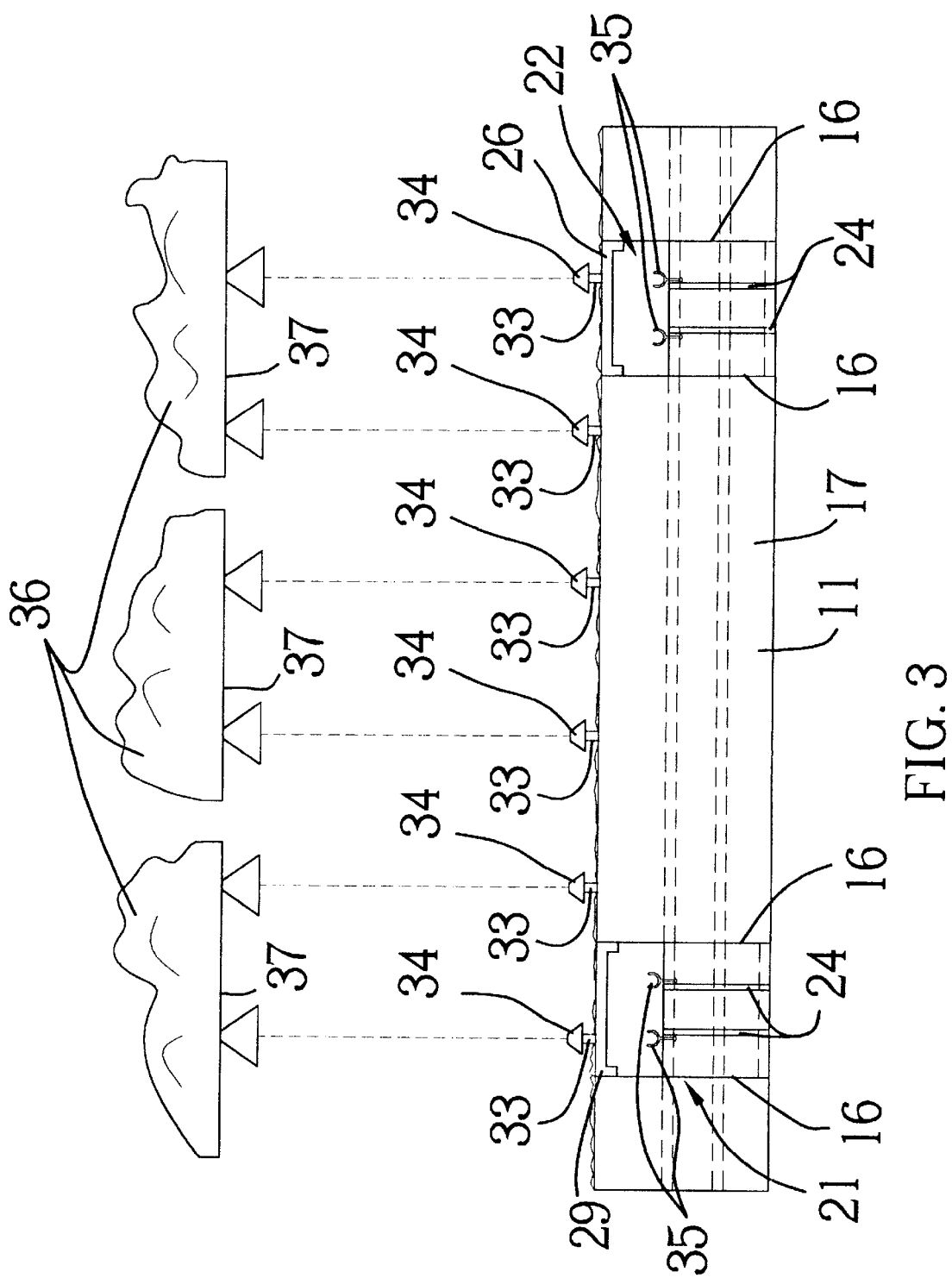
FIG. 3 is a top plan view of the wall member of the present invention.
Figure 4:
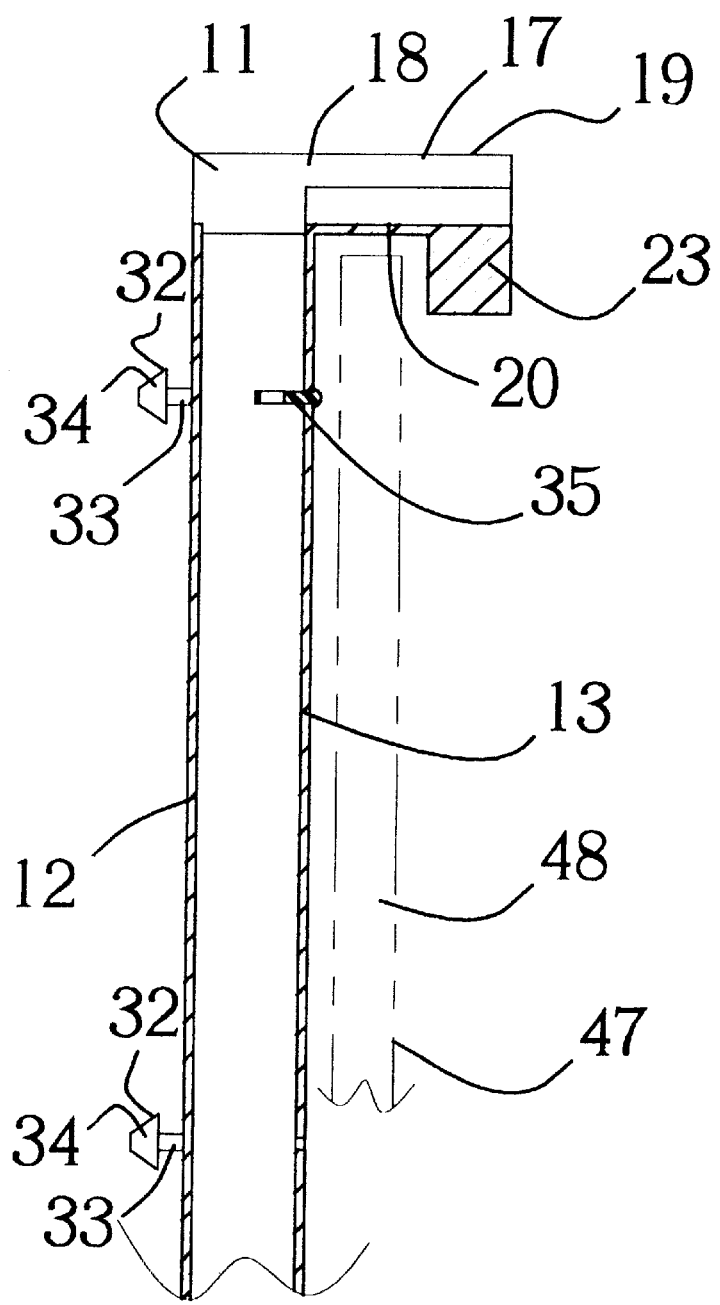
FIG. 4 is a cross-sectional view of the wall of the present invention.
Figure 6:
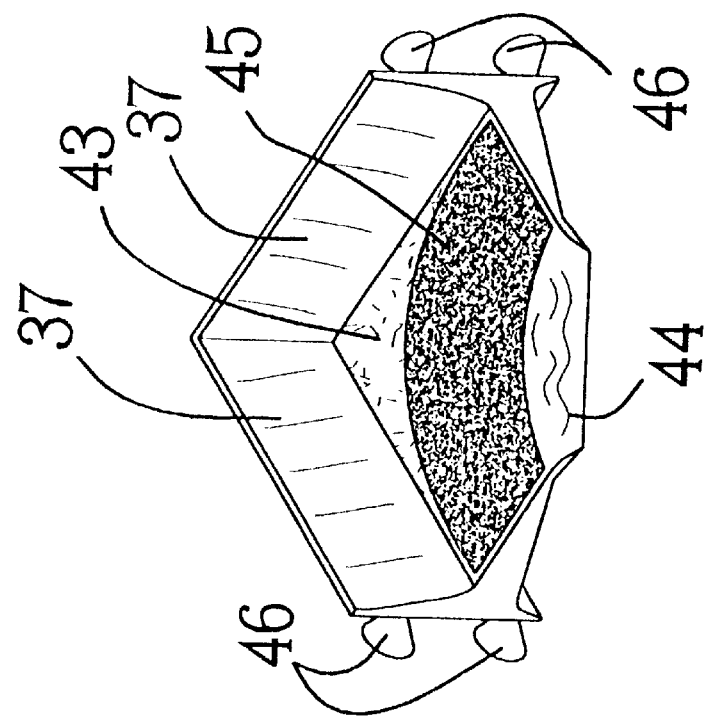
FIG. 6 is a perspective view of the beach-simulated attachment of the present invention.
Figure 5:
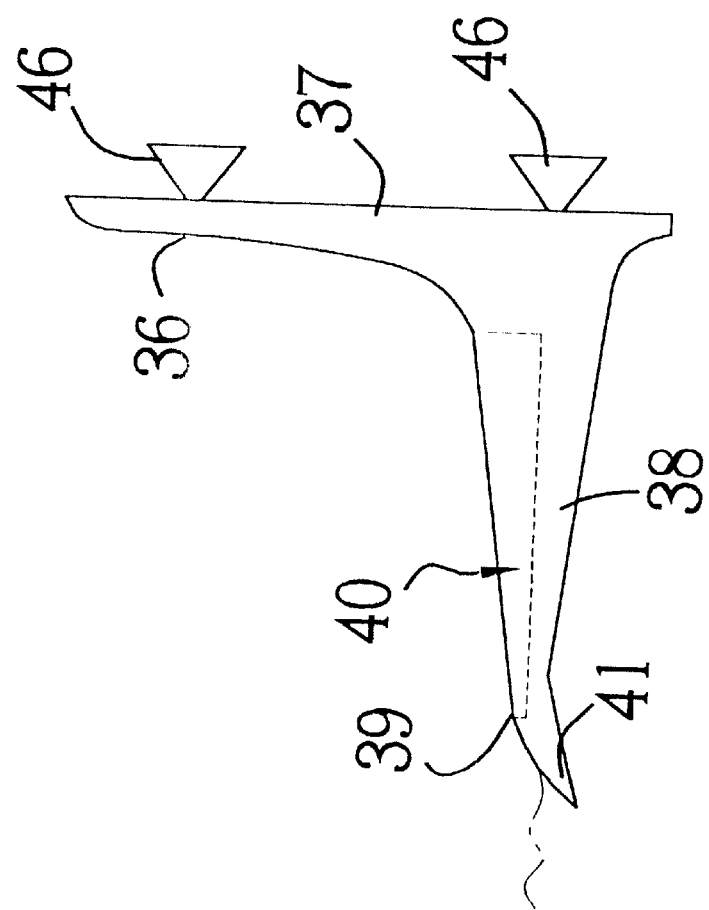
FIG. 5 is a side elevational view of the ledge-simulated attachment of the present invention.

With reference now to the drawings, and in particular to FIGS. 1 through 6 thereof, a new decorative attachment for an aquarium embodying the principles and concepts of the present invention and generally designated by the reference numeral 10 will be described.

As best illustrated in FIGS. 1 through 6, the decorative attachment for an aquarium 10 generally comprises a wall assembly including a wall structure 11 having a front wall 12 and a back wall 13 being spaced from the front wall 12, and also having an overhang portion 17 being securely and conventionally disposed at a top of the front and back walls 12,13 and extending rearwardly thereof and being adapted to mount upon a back wall 48 of an aquarium 47. The wall assembly further includes vertical dividers 16 being spaced apart and being conventionally disposed between the front wall 12 and the back wall 13 of the wall structure 11. The wall structure 11 includes longitudinal openings 14,15 extending a height of the wall structure 11 and being spaced apart and being disposed through the front wall 12 and forming vertical channels which are adapted to receive hoses and wires located in the aquarium 47. The wall assembly also includes cover members 26,29 being removably disposed in the longitudinal openings 14,15 and being essentially flush with the front wall 12. Each of the cover members 26,29 has a bottom end 27,30 and a slot 28,31 disposed in the bottom end 27,30. The overhang portion 17 includes a main portion 18 which conventionally extends rearwardly of the back wall 13, and also includes an end portion 23 which is conventionally attached to the main portion 18 and which is spaced from the back wall 13 and which is angled relative to the main portion 18. The main portion 18 has a top wall 19 and a bottom wall 20. The top wall 19 has slots 21,22 being disposed therethrough. Each of the slots 21,22 is in alignment with a respective one of the longitudinal openings 14,15. The wall structure 11 further includes dividers 24 being conventionally disposed upon the bottom wall 20 of the main portion 18 and in the slots 21,22 of the overhang portion 17. The dividers 24 are spaced apart and are adapted to receive the hoses and wires for the aquarium 47. The wall structure 11 also includes a plurality of holes 25 being disposed through the back wall 13 in the channels and being adapted to receive wire clips 35 for supporting the wires in the aquarium 47.

A plurality of scenery attachment support members 32 are securely and conventionally attached to the wall structure 11. The scenery attachment support members 32 are securely disposed in and upon the front wall 12 and the cover members 26,29 of the wall assembly. The scenery attachment support members 32 are lug members 32 having a shaft portion 33 which are securely disposed in the front wall 12 and the cover members 26,29 and also having conical-shaped end portions 34 which are disposed before the front wall 12 and the cover members 26,29.

A plurality of scenery attachments 36 are removably mounted to the wall structure 11. The scenery attachments 36 include back walls 37 and a plurality of clip-like fastening members 46 being securely and conventionally attached to the back walls 37 and being adapted to securely clip about the conical-shaped end portions 34 of the scenery attachment support members 32 for supporting the scenery attachments 36 upon the wall assembly. The scenery attachments 36 further include a ledge-simulated scenery attachment having a ledge 38 being securely and conventionally attached to a respective back wall 37 of the scenery attachments 36 and extending outwardly therefrom. The ledge 38 has a top side 39 and a recessed portion 40 disposed in the top side 39 and being adapted to support sand 42 therein. The ledge 38 further has a lip portion 41 to simulate a tidal zone. The scenery attachments 36 also include a beach-simulated scenery attachment having a bottom wall 43 and a respective back wall 37 and further having sand 45 being disposed upon the bottom wall 43 with the bottom wall 43 further having a lip portion 44.

In use, the user places the decorative attachment assembly 10 in the aquarium 47 with a fish 49 and puts the overhang portion over the back wall 48 of the aquarium 47 and runs the hose and wires for the aquarium through the channels and through the slots 28,31 of the cover members 26,29.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A decorative attachment assembly for an aquarium comprising:

a wall assembly including a wall structure having a front wall and a back wall, each of said walls being spaced apart from each other, said wall assembly having an overhang portion being mounted on a top of said front and back walls and extending rearwardly thereof for mounting on a back wall of an aquarium;

a plurality of scenery attachment support members being mounted to said wall structure;

a plurality of scenery attachments being releasably attachable to said wall structure; and wherein said wall structure includes longitudinal openings extending a height of said wall structure and being spaced apart and being disposed through said front wall and forming vertical channels which are adapted to receive hoses and wires located in the aquarium.

2. A decorative attachment assembly for an aquarium as described in claim 1, wherein said wall assembly further includes vertical dividers being spaced apart and being disposed between said front wall and said back wall of said wall structure.

3. A decorative attachment assembly for an aquarium as described in claim 1, wherein said wall assembly also includes cover members being removably disposed in said longitudinal openings and being essentially flush with said front wall, each of said cover members having a bottom end and a slot disposed in said bottom end.

4. A decorative attachment assembly for an aquarium as described in claim 1, wherein said overhang portion includes a main portion which extends rearwardly of said back wall, and also includes an end portion which is attached to said main portion and which is spaced from said back wall and which is angled relative to said main portion, said main portion having a top wall and a bottom wall, said top wall having slots being disposed therethrough, each of said slots being in alignment with a respective one of said longitudinal openings.

5. A decorative attachment assembly for an aquarium as described in claim 4, wherein said wall structure further includes dividers being disposed upon said bottom wall of said main portion and in said slots of said overhang portion, said dividers being spaced apart and being adapted to receive the hoses and wires for the aquarium.

6. A decorative attachment assembly for an aquarium as described in claim 1, wherein said wall structure also includes a plurality of holes being disposed through said back wall in said channels and being adapted to receive wire clips for supporting the wires in the aquarium.

7. A decorative attachment assembly for an aquarium as described in claim 3, wherein said scenery attachment support members are securely disposed in and upon said front wall and said cover members of said wall assembly, said scenery attachment support members being lug members having a shaft portion which are securely disposed in said front wall and said cover members and also having conical-shaped end portions which are disposed before said front wall and said cover members.

8. A decorative attachment assembly for an aquarium as described in claim 7, wherein said scenery attachments include back walls and a plurality of clip-like fastening members being securely attached to said back walls and being adapted to securely clip about said conical-shaped end portions of said scenery attachment support members for supporting said scenery attachments upon said wall assembly.

9. A decorative attachment assembly for an aquarium as described in claim 8, wherein said scenery attachments further include a ledge-simulated scenery attachment having a ledge being securely attached to a respective said back wall of said scenery attachments and extending outwardly therefrom, said ledge having a top side and a recessed portion disposed in said top side and being adapted to support sand therein, said ledge further having a lip portion.

10. A decorative attachment assembly for an aquarium as described in claim 9, wherein said scenery attachments also include a beach-simulated scenery attachment having a bottom wall and a respective said back wall and further having sand being disposed upon said bottom wall, said bottom wall further having a lip portion.

11. A decorative attachment assembly for an aquarium comprising:

a wall assembly including a wall structure having a front wall and a back wall being spaced from said front wall, and also having an overhang portion being securely disposed at a top of said front and back wall and extending rearwardly thereof and being adapted to mount upon a back wall of an aquarium;

a plurality of scenery attachment support members being securely attached to said wall structure;

a plurality of scenery attachments being removably mounted to said wall structure;

wherein said wall assembly further includes vertical dividers being spaced apart and being disposed between said front wall and said back wall of said wall structure; and wherein said wall structure includes longitudinal openings extending a height of said wall structure and being spaced apart and being disposed through said front wall and forming vertical channels which are adapted to receive hoses and wires located in the aquarium.

12. A decorative attachment assembly for an aquarium as described in claim 11, wherein said wall assembly also includes cover members being removably disposed in said longitudinal openings and being essentially flush with said front wall, each of said cover members having a bottom end and a slot disposed in said bottom end.

13. A decorative attachment assembly for an aquarium as described in claim 11, wherein said overhang portion includes a main portion which extends rearwardly of said back wall, and also includes an end portion which is attached to said main portion and which is spaced from said back wall and which is angled relative to said main portion, said main portion having a top wall and a bottom wall, said top wall having slots being disposed therethrough, each of said slots being in alignment with a respective one of said longitudinal openings.

14. A decorative attachment assembly for an aquarium as described in claim 13, wherein said wall structure further includes dividers being disposed upon said bottom wall of said main portion and in said slots of said overhang portion, said dividers being spaced apart and being adapted to receive the hoses and wires for the aquarium.

15. A decorative attachment assembly for an aquarium as described in claim 11, wherein said wall structure also includes a plurality of holes being disposed through said back wall in said channels and being adapted to receive wire clips for supporting the wires in the aquarium.

16. A decorative attachment assembly for an aquarium as described in claim 12, wherein said scenery attachment support members are securely disposed in and upon said front wall and said cover members of said wall assembly, said scenery attachment support members being lug members having a shaft portion which are securely disposed in said front wall and said cover members and also having conical-shaped end portions which are disposed before said front wall and said cover members.

17. A decorative attachment assembly for an aquarium as described in claim 16, wherein said scenery attachments include back walls and a plurality of clip-like fastening members being securely attached to said back walls and being adapted to securely clip about said conical-shaped end portions of said scenery attachment support members for supporting said scenery attachments upon said wall assembly.

18. A decorative attachment assembly for an aquarium as described in claim 17, wherein said scenery attachments further include a ledge-simulated scenery attachment having a ledge being securely attached to a respective said back wall of said scenery attachments and extending outwardly therefrom, said ledge having a top side and a recessed portion disposed in said top side and being adapted to support sand therein, said ledge further having a lip portion.

19. A decorative attachment assembly for an aquarium as described in claim 18, wherein said scenery attachments also include a beach-simulated scenery attachment having a bottom wall and a respective said back wall and further having sand being disposed upon said bottom wall, said bottom wall further having a lip portion.

20. A decorative attachment assembly for an aquarium comprising:

a wall assembly including a wall structure having a front wall and a back wall being spaced from said front wall, and also having an overhang portion being securely disposed at a top of said front and back wall and extending rearwardly thereof and being adapted to mount upon a back wall of an aquarium, said wall assembly further including vertical dividers being spaced apart and being disposed between said front wall and said back wall of said wall structure, said wall structure including longitudinal openings extending a height of said wall structure and being spaced apart and being disposed through said front wall and forming vertical channels which are adapted to receive hoses and wires located in the aquarium, said wall assembly also including cover members being removably disposed in said longitudinal openings and being essentially flush with said front wall, each of said cover members having a bottom end and a slot disposed in said bottom end, said overhang portion including a main portion which extends rearwardly of said back wall, and also including an end portion which is attached to said main portion and which is spaced from said back wall and which is angled relative to said main portion, said main portion having a top wall and a bottom wall, said top wall having slots being disposed therethrough, each of said slots being in alignment with a respective one of said longitudinal openings, said wall structure further including dividers being disposed upon said bottom wall of said main portion and in said slots of said overhang portion, said dividers being spaced apart and being adapted to receive the hoses and wires for the aquarium, said wall structure also including a plurality of holes being disposed through said back wall in said channels and being adapted to receive wire clips for supporting the wires in the aquarium;

a plurality of scenery attachment support members being securely attached to said wall structure, said scenery attachment support members being securely disposed in and upon said front wall and said cover members of said wall assembly, said scenery attachment support members being lug members having a shaft portion which are securely disposed in said front wall and said cover members and also having conical-shaped end portions which are disposed before said front wall and said cover members; and a plurality of scenery attachments being removably mounted to said wall structure, said scenery attachments including back walls and a plurality of clip-like fastening members being securely attached to said back walls and being adapted to securely clip about said conical-shaped end portions of said scenery attachment support members for supporting said scenery attachments upon said wall assembly, said scenery attachments further including a ledge-simulated scenery attachment having a ledge being securely attached to a respective said back wall of said scenery attachments and extending outwardly therefrom, said ledge having a top side and a recessed portion disposed in said top side and being adapted to support sand therein, said ledge further having a lip portion, said scenery attachments also including a beach-simulated scenery attachment having a bottom wall and a respective said back wall and further having sand being disposed upon said bottom wall, said bottom wall further having a lip portion.

* * * * *